United States Patent [19]

Maghon

[11] 4,247,256

[45] Jan. 27, 1981

[54] GAS TURBINE DISC ROTOR

[75] Inventor: Helmut Maghon, Mülheim, Fed. Rep. of Germany

[73] Assignee: Kraftwerk Union Aktiengesellschaft, Mülheim, Fed. Rep. of Germany

[21] Appl. No.: 836,476

[22] Filed: Sep. 26, 1977

[30] Foreign Application Priority Data

Sep. 29, 1976 [DE] Fed. Rep. of Germany ....... 2643886

[51] Int. Cl.³ ............................................. F01D 5/06
[52] U.S. Cl. ........................... 416/198 A; 416/244 A; 416/500
[58] Field of Search .................. 416/198, 198 A, 199, 416/200, 200 A, 201, 201 A, 204, 204 A, 214, 214 A, 500, 244, 244 A, 194

[56] References Cited

U.S. PATENT DOCUMENTS

| 1,873,956 | 8/1932 | Dahlstrand | 416/244 A |
| 2,619,317 | 11/1952 | Traupel | 416/244 A |
| 2,654,565 | 10/1953 | Feilden | 416/214 A |
| 2,799,445 | 7/1957 | Hull | 416/244 A |
| 2,861,823 | 11/1958 | Perry | 416/198 A |
| 3,051,437 | 8/1962 | Morley et al. | 416/244 A |
| 3,165,342 | 1/1965 | Anderson | 416/204 A |
| 3,304,052 | 2/1967 | Warner et al. | 416/244 A |
| 3,680,979 | 8/1972 | Hansen et al. | 416/198 A |
| 3,976,399 | 8/1976 | Schmoch | 416/198 A |

FOREIGN PATENT DOCUMENTS

800524 8/1956 United Kingdom ..................... 416/199

*Primary Examiner*—Everette A. Powell, Jr.
*Assistant Examiner*—A. N. Trausch, III
*Attorney, Agent, or Firm*—Herbert L. Lerner

[57] ABSTRACT

In a gas turbine rotor of disc-type construction with a tie rod braced at least at one location along the length thereof against compressor or turbine discs by ring-shaped intermediate members, the intermediate members includes substantially conically expansible turning rings having a wider diameter end engageable in a circular groove formed in a lateral surface of one of the discs, the turning rings having at the smaller diameter end thereof an inner peripheral surface with which they are braced on the tie rod.

3 Claims, 6 Drawing Figures

GAS TURBINE DISC ROTOR

The invention relates to a gas turbine rotor of disc construction type and, more particularly, of such a turbine rotor having a tie rod braced at least at one location along the length thereof against compressor or turbine discs by ring-shaped intermediate members.

Such a gas turbine rotor has become known from U.S. Pat. No. 3,976,399 wherein, between the tie rod or connecting rod and the rotor discs, divided or split shells or bushings are disposed which are held together by shrink-fitted rings. During running of the machine, these shells or bushings expand or widen under the action of centrifugal force so that a close contact between the rotor discs and the tie rod or connecting rod is attained. This construction has the disadvantage, however, that the emplacement of the split shells or bushings against the discs is not well-defined and that material abrasions can occur at the contact locations between the tie rod, the shells or bushing and the discs.

It is accordingly an object of the invention to provide a gasturbine rotor of disc-type construction having a form-locking bracing of the tie rod or connecting rod with respect to the rotor discs which, during operation of the machine, ensures a well-defined and reliable contact which is, moreover, relatively simple to install.

With the foregoing and other objects in view, there is provided, in accordance with the invention, in a gas turbine rotor of disc-type construction with a tie rod braced at least at one location along the length thereof against compressor or turbine discs by ring-shaped intermediate members, the intermediate members comprising substantially conically expansible turning rings having a wider diameter end engageable in a circular groove formed in a lateral surface of one of the discs, said turning rings having at the smaller diameter end thereof an inner peripheral surface with which they are braced on the tie rod.

During centrifugal-force expansion of the discs in the course of operation of the machine, the one end of the turning ring becomes expanded or widened, and the ring tends to turn inside out, while the other end, however, presses against the tie rod. A tight bracing between the disc and the tie rod is thereby attained.

In accordance with another feature of the invention, the turning rings are disposed on a reinforced shaft collar on the tie rod and have a cylindrical extension at the expanded end thereof, with which the wider diameter end of the respective turning ring is engageable in the circular groove.

In accordance with a further feature of the invention, the gas turbine rotor includes a holder ring inserted between each of the turning rings and the next following rotor disc for preventing axial displacement of the turning ring.

In accordance with a concomitant feature of the invention, the gas turbine rotor includes a circular stop formed on the conical outer surface of the turning ring, the holder ring engaging in the circular stop.

Other features which are considered as characteristic for the invention are set forth in the appended claims.

Although the invention is illustrated and described herein as embodied in gas turbine rotor of disc construction type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
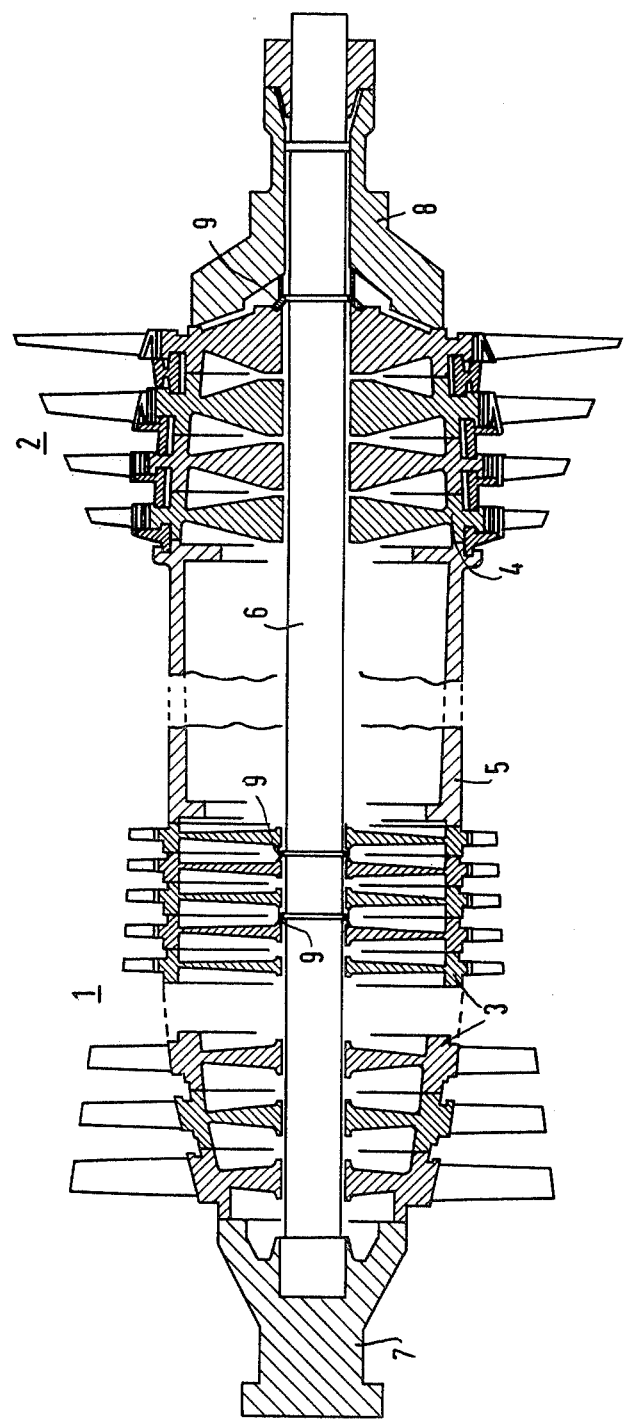
FIG. 1 is a longitudinal sectional view of a gas-turbine rotor partly broken away and shortened.

Referring now to the drawing and first, particularly, to FIG. 1 thereof, there is shown a gas-turbine rotor formed of a compressor part 1 and a turbine part 2 which are made up of individual discs 3 and 4. A hollow shaft 5 is connected from the compressor part 1 to the turbine part 2. All of the parts are held together axially by a central anchoring or tie rod 6 which is braced in a forward shaft stump 7 and a rear hollow shaft part 8. The discs 3 and 4 as well as the hollow shaft sections 5, 7 and 8 are centered relative to one another through Hirth-type serrations which also transmit the torque.

To brace the tie rod 6 with respect to the compressor and rotor discs 3 and 4, so called turning rings 9 are provided, in accordance with the invention, which are inserted between the tie rod 6 and several of the rotor discs 3 and 4.

Figure 2:
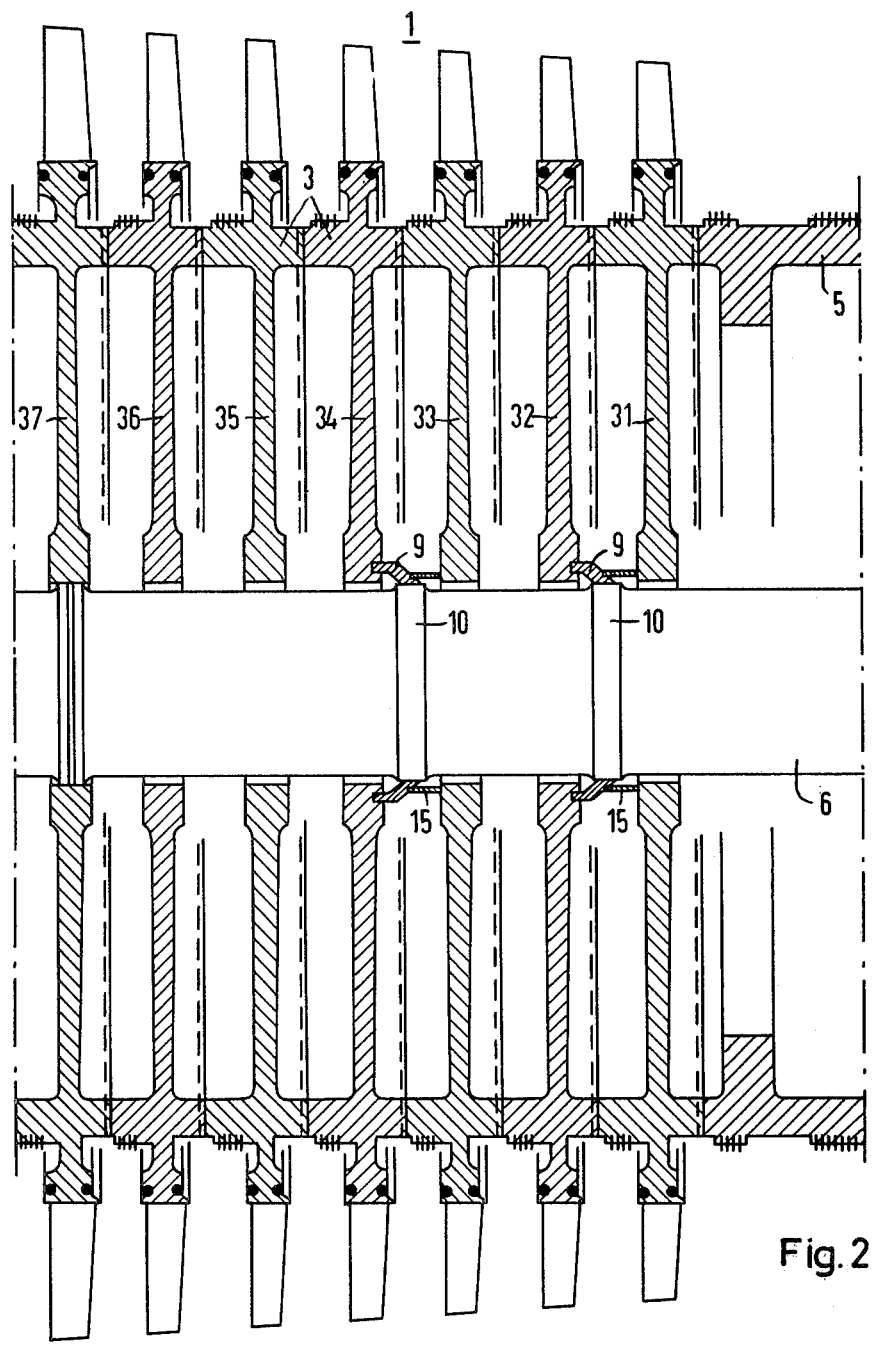
FIG. 2 is an enlarged fragmentary view of FIG. 1 in the region of the compressor discs thereof.

FIG. 2 shows a longitudinal sectional view of the high-pressure part of the compressor 1 with compressor discs 31 to 37. In the intermediate spaces between the discs 31 and 32, as well as between the discs 33 and 34, a respective turning spring 9 is then seated on a reinforced shaft collar 10, the cuff springs 9 engaging with the conically expanded ends thereof in the discs 32 and 34 and prevented from axial displacement by holder rings 15.

Figure 3:
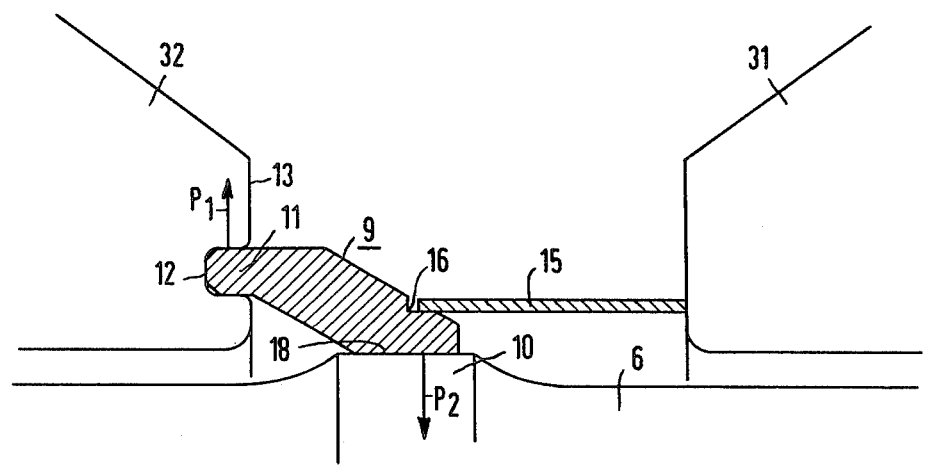
FIG. 3 is a further enlarged fragmentary view of FIG. 1 in the region of a turning ring thereof.

In particular, such a turning ring 9 and the exact disposition thereof is shown in FIG. 3. The expanded end of the turning ring 9 has a cylindrical extension 11 which engages in a circular groove 12 formed in the lateral surface 13 of the compressor disc 32. When, during operation, the disc 32 expands due to the action of centrifugal force, a force P, thus acts upon the cylindrical end 11 of the turning ring 9 and, since the ring 9 seeks to turn inside out, a force $P_2$ acts upon the surface 18 thereof with which it engages the tie rod 6. Due to this mutual bracing, a firm bracing of the tie rod 6 against the rotor discs is thus produced, during operation of the machine, and the vibrations of the tie rod 6 are largely damped. Through suitable dimensioning of the turning ring 9 as well as of the fits between the ring extension 11 and the circular groove 12, on the one hand, as well as of the contact surface 18 thereof with the tie rod 6, on the other hand, the forces $P_1$ and $P_2$ can be brought to predetermined values.

A further advantage of the device of the invention is that the force $P_2$ first appears only if the rotor rotates whereas, during assembly of the rotor, the force $P_2$ is still zero and, accordingly, when bracing the tie rod 6 at the engagement location 10, no freezing can occur.

In order to prevent axial displacement of the turning ring 9 and consequent sliding thereof out of the groove 12, a holder ring 15 is provided, which is disposed between the turning ring 9 and an adjacent rotor disc 31. In order to produce a defined bracing point for this holder ring 15 at the turning ring 9, a step-shaped stop 16 is provided wherein an end of the holder ring 15 engages and whereby this holder ring 15 is centered.

Figures 4A, 4B, 4C:
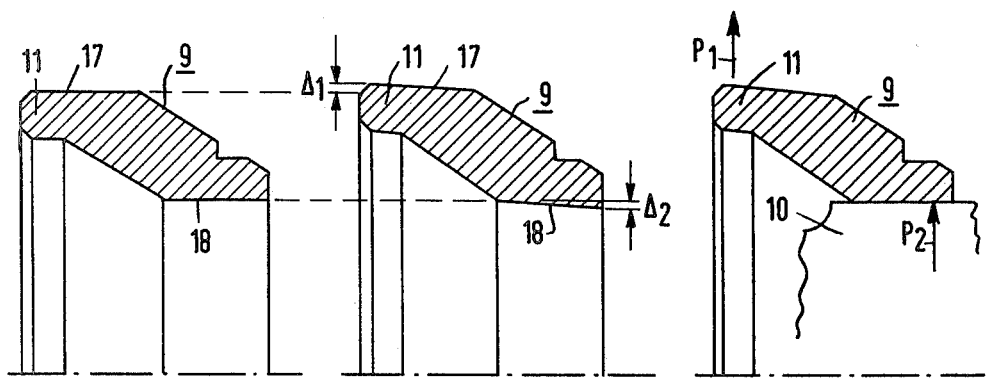
FIG. 4a to 4c are views similar to that of FIG. 3 of the turning ring per se showing the operation thereof in nonloaded and in expanded or enlarged condition thereof.

In FIGS. 4a to 4c, the principal operation of the turning ring 9 is shown. FIG. 4a shows the turning ring 9 in nondeformed condition, with outer and inner peripheral surfaces 17 and 18 exactly centered with respect to one another. If, in operation, during expansion of the disc at the cylindrical extension 11 of the turning ring 9, as shown in FIG. 4b, the expansion $\Delta 1$ is purported to be radially outwardly, the right-hand edge or the right-hand end of the cylindrical surface 18 being thus displaced an amount $\Delta 2$ radially inwardly. The force $P_1$ acts upon the left-hand edge. In FIG. 4c, the actual operation condition during deformation with obstructed expansion at the inner diameter is illustrated. Since the tie rod 6, in this case, obstructs the deformation $\Delta 2$ of the inner peripheral surface 18, the force $P_2$ is thereby produced thereat.

The hereinafterdescribed bracing of the tie rod 6 with respect to the rotor discs 3, 4 can be effected at any critical location of the compressor part 1 as well as of the turbine part 2. As is apparent from FIG. 1, a bracing of the turning ring 9 can occur in the gas turbine part 2 also with respect to the adjacent hollow shaft part 8.

There are claimed:

1. In a gas turbine gas rotor of disc-type construction with a central tie rod having axially disposed rotor discs, shaft stumps disposed at ends of the rotor discs and toothed rim means for centrally fixing the rotor discs and shaft stumps in mutual engagement against rotation with respect to each other, said tie rod being braced at least at one location along the length thereof directly against compressor or turbine discs by ring-shaped intermediate means for directly transferring radial expansion force of the discs to pressure on the tie rod to damp vibration thereof, the intermediate means comprising substantially conically expansible turning rings slid on the tie rod and having a wider diameter end with a cylindrical extension engageable in a circular groove formed in a lateral surface of one of the discs, said turning rings having at the smaller diameter end thereof an inner peripheral surface along substantially the entire axial length thereof with which they are braced on a reinforced shaft collar disposed on the tie rod when not in operation, and said peripheral surface having an edge thereof closest to said wider diameter end at which said turning rings are privoted during operation to receive the radial expansion damping force.

2. Gas turbine rotor according to claim 1 including a holder ring inserted between each of said turning rings and the next following rotor disc for preventing axial displacement of said turning ring.

3. Gas turbine rotor according to claim 2 including a circular stop formed on the conical outer surface of said turning ring, said holder ring engaging in said circular stop.

* * * * *